(12) United States Patent
Raiche

(10) Patent No.: US 9,598,248 B2
(45) Date of Patent: Mar. 21, 2017

(54) APPARATUS FOR LOADING MATERIAL

(75) Inventor: Wayne Raiche, Matsqui (CA)

(73) Assignee: Loewen Welding & Manufacturing Ltd., Matsqui, British Columbia (CA)

( * ) Notice: Subject to any disclaimer, the term of this patent is extended or adjusted under 35 U.S.C. 154(b) by 0 days.

(21) Appl. No.: 13/469,482

(22) Filed: May 11, 2012

(65) Prior Publication Data

US 2013/0192957 A1 Aug. 1, 2013

Related U.S. Application Data

(60) Provisional application No. 61/593,087, filed on Jan. 31, 2012.

(51) Int. Cl.

| | |
|---|---|
| *B65G 65/06* | (2006.01) |
| *B65G 65/02* | (2006.01) |
| *B65G 19/14* | (2006.01) |
| *B65G 17/12* | (2006.01) |
| *B65G 15/44* | (2006.01) |
| *B65G 65/10* | (2006.01) |

(52) U.S. Cl.
CPC ............ *B65G 65/06* (2013.01); *B65G 15/44* (2013.01); *B65G 17/12* (2013.01); *B65G 19/14* (2013.01); *B65G 65/02* (2013.01); *B65G 65/10* (2013.01)

(58) Field of Classification Search
CPC .. A01C 3/04; A01C 3/06; B65G 65/06; B65G 65/02; B65G 65/10; B65G 19/12; B65G 19/14; B65G 15/44
USPC .... 198/716, 860.4, 822, 550.4, 550.12, 592, 198/300, 520, 307.1, 311; 414/809; 37/373
See application file for complete search history.

(56) References Cited

U.S. PATENT DOCUMENTS

| | | | | |
|---|---|---|---|---|
| 685,684 | A * | 10/1901 | Jestrab | B65G 65/00 198/307.1 |
| 974,905 | A * | 11/1910 | Mohrbach | B65G 65/00 193/31 R |
| 1,113,669 | A * | 10/1914 | Maples | B65G 65/00 198/307.1 |
| 1,272,655 | A * | 7/1918 | Gawlet | 198/519 |

(Continued)

OTHER PUBLICATIONS

Official Action for U.S. Appl. No. 13/335,321 mailed Jan. 9, 2014, 6 pages.

*Primary Examiner* — Thomas Randazzo
(74) *Attorney, Agent, or Firm* — Sheridan Ross P.C.

(57) ABSTRACT

The present invention provides an apparatus for loading material comprising: a housing defining a loading conduit and a return conduit wherein the loading conduit and return conduit are operatively connected at a first location configured for material intake and a second location configured for material output; a loading mechanism operative within the housing, said loading mechanism including an endless belt having a plurality of loading devices anchored thereto, the loading mechanism configured to travel within the loading conduit from the first location to the second location and subsequently within the return conduit from the second location to the first location, said loading mechanism picking up material at the material intake and expelling material at the material output; and a drive system operatively connected with the loading mechanism, the drive system configured to provide power to the loading mechanism.

20 Claims, 8 Drawing Sheets

(56) References Cited

U.S. PATENT DOCUMENTS

| | | | | |
|---|---|---|---|---|
| 1,313,695 A * | 8/1919 | Jackson | B65G 65/00 198/307.1 |
| 2,539,939 A * | 1/1951 | Jack | B60P 1/36 414/21 |
| 2,627,712 A * | 2/1953 | Chatten | E01H 12/00 171/126 |
| 3,001,653 A * | 9/1961 | Wilton | E02F 3/086 198/300 |
| 3,512,282 A * | 5/1970 | Gurries | E02F 3/08 198/308.1 |
| 3,585,670 A | 6/1971 | MacKinnon | |
| 3,756,369 A * | 9/1973 | Hulette | B65G 65/06 198/511 |
| 4,037,390 A * | 7/1977 | Vogelenzang | A01D 34/86 198/300 |
| 4,136,964 A * | 1/1979 | Swisher, Jr. | E01C 19/1045 198/690.2 |
| 4,184,581 A * | 1/1980 | Crawshay | B65G 65/04 198/301 |
| 4,200,950 A | 5/1980 | Coverley | |
| 4,218,226 A | 8/1980 | Boozer | |
| 4,307,522 A * | 12/1981 | Colville | E02F 3/6481 37/414 |
| 4,534,461 A * | 8/1985 | Silverthorn | B65G 17/126 198/592 |
| 4,562,918 A * | 1/1986 | Tschernatsch et al. | 198/509 |
| 4,578,840 A | 4/1986 | Pausch | |
| 4,664,251 A * | 5/1987 | Gough | B65G 15/16 198/607 |
| 4,681,503 A * | 7/1987 | Nolte | B65G 67/606 198/509 |
| 4,711,403 A * | 12/1987 | Gregory, Sr. | A01K 31/04 119/442 |
| 4,845,801 A | 7/1989 | Milly et al. | |
| 4,935,984 A | 6/1990 | Bryant et al. | |
| 5,010,620 A | 4/1991 | Young | |
| 5,094,018 A * | 3/1992 | Theurer | E01B 27/02 104/2 |
| 5,226,757 A | 7/1993 | Tarrant | |
| 5,238,346 A * | 8/1993 | Grathoff | B65G 67/606 198/611 |
| 5,590,754 A * | 1/1997 | Lowery | B65G 47/44 198/512 |
| 6,378,691 B2 * | 4/2002 | Phelps | 198/456 |
| 7,797,789 B2 | 9/2010 | Nuhn | |
| 7,963,387 B2 * | 6/2011 | Carmody | B65G 19/08 198/308.1 |
| 8,191,202 B2 | 6/2012 | Nuhn | |
| 8,336,163 B2 | 12/2012 | Nuhn | |
| 8,348,049 B2 * | 1/2013 | Ohman | B65G 15/42 198/699 |
| 8,365,346 B2 | 2/2013 | Coppola et al. | |
| 8,851,276 B2 * | 10/2014 | Strieker | B65G 15/60 198/810.04 |
| 2008/0035763 A1 * | 2/2008 | Dahlgren | A01C 3/04 239/651 |
| 2012/0159735 A1 | 6/2012 | Raiche | |

\* cited by examiner

APPARATUS FOR LOADING MATERIAL

CROSS REFERENCE TO RELATED APPLICATIONS

The present application claims priority under 35 U.S.C. §119 to U.S. Provisional Application Ser. No. 61/593,087, entitled Apparatus for Loading Material, the disclosure of which is incorporated herein by reference.

FIELD OF THE TECHNOLOGY

The present technology pertains in general to an apparatus for loading materials. Specifically, the apparatus can be used for loading various types of generally solid material.

BACKGROUND

Animal husbandry facilities, such as dairy barns, feed lots or hog barns, include alleys or gutters for manure collection. Vehicles such as tractors or skid-steer loaders are equipped with scraper blades or front-end bucket systems to transfer manure accumulated in the alley or gutter to one end of the barn for removal and disposal. However, with the very large facilities that are becoming quite common in modern dairy farming, sometimes with an overall length in excess of 1000 feet, the quantity of accumulated material is too great to transfer to one end of the facility.

Presently, vacuum type systems are available for the collection of materials in these types of facilities, for example the Honey-Vac™. However, these types of systems are more suitable for more liquid and semi-liquid type materials and may not perform at a desired operational level having regard to more solid material, which may include liquid or semi-liquid material mixed with bedding materials and/or frozen or semi-frozen material, for example.

Therefore there is a need for improvements in the collection and removal of material from animal husbandry facilities, in particular for material which has a solid, semi-solid consistency.

This background information is provided to reveal information believed by the applicant to be of possible relevance to the present invention. No admission is necessarily intended, nor should be construed, that any of the preceding information constitutes prior art against the present invention.

SUMMARY

An object of the present technology is to provide an apparatus for loading material. In accordance with an aspect of the present technology, there is provided an apparatus for loading material comprising: a housing defining a loading conduit and a return conduit wherein the loading conduit and return conduit are operatively connected at a first location configured for material intake and a second location configured for material output; a loading mechanism operative within the housing, said loading mechanism including an endless belt having a plurality of loading devices anchored thereto, the loading mechanism configured to travel within the loading conduit from the first location to the second location and subsequently within the return conduit from the second location to the first location, said loading mechanism picking up material at the material intake and expelling material at the material output; and a drive system operatively connected with the loading mechanism, the drive system configured to provide power to the loading mechanism.

DETAILED DESCRIPTION

Definitions

As used herein the term "material" is used to refer to a substantially solid material and may include various forms, modifications or combinations of one or more of animal waste, manure, straw, hay, foliage or other organic or inorganic matter, solidified liquid matter, for example frozen liquids, semi-liquids or the like.

As used herein, the term "surface" with reference to collection of material may be used to refer to a floor or bottom of a barn, hutch, pen, stable or other building for housing livestock, grain, fertilizer, salt, sand or other material storage buildings, for example.

As used herein, the term "about" refers to a +/−10% variation from the nominal value. It is to be understood that such a variation is always included in a given value provided herein, whether or not it is specifically referred to.

Unless defined otherwise, all technical and scientific terms used herein have the same meaning as commonly understood by one of ordinary skill in the art to which this invention belongs.

The present technology provides an apparatus for loading material. The apparatus comprises a housing which defines a loading conduit and a return conduit, wherein the loading conduit and return conduit are operatively connected at a first location configured for material intake and a second location configured for material output. The apparatus further comprises a loading mechanism which is operative within the housing, wherein the loading mechanism includes an endless belt having a plurality of loading devices anchored thereto. The loading mechanism is configured to travel within the loading conduit from the first location to the second location and subsequently within the return conduit from the second location to the first location, such that the loading mechanism is oriented to pick up material at the material intake and expel material at the material output. Operatively connected to the loading mechanism is a drive system which is configured to provide power to the loading mechanism, thereby enabling operation thereof.

In some embodiments, the apparatus further includes a material moving system which is configured to guide the material being collected towards the material intake, thereby enhancing the collection of the material.

In some embodiments, the apparatus is operatively coupled to a material carrying device, or trailer, which is configured to receive the material from the material output and provide a means for transporting the collected material away from a collection location, for example within a barn. In some embodiments the apparatus is interconnected with the material carrying device forming a single interconnected system. In some embodiments the apparatus is pin connected to the material carrying device, for example wherein the material carrying device is operable without the apparatus connected thereto.

Figure 1A:
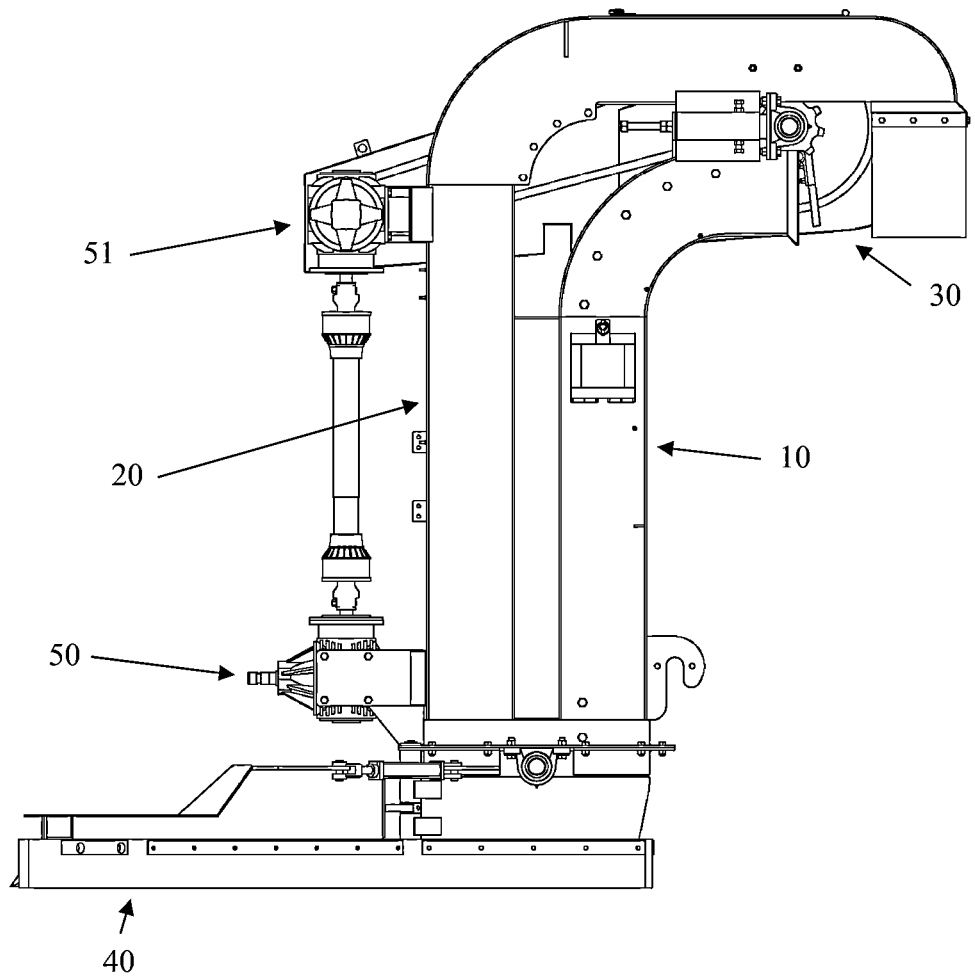
FIG. 1A illustrates an elevation view of an apparatus for loading material according to embodiments of the present technology.
Figure 1B:
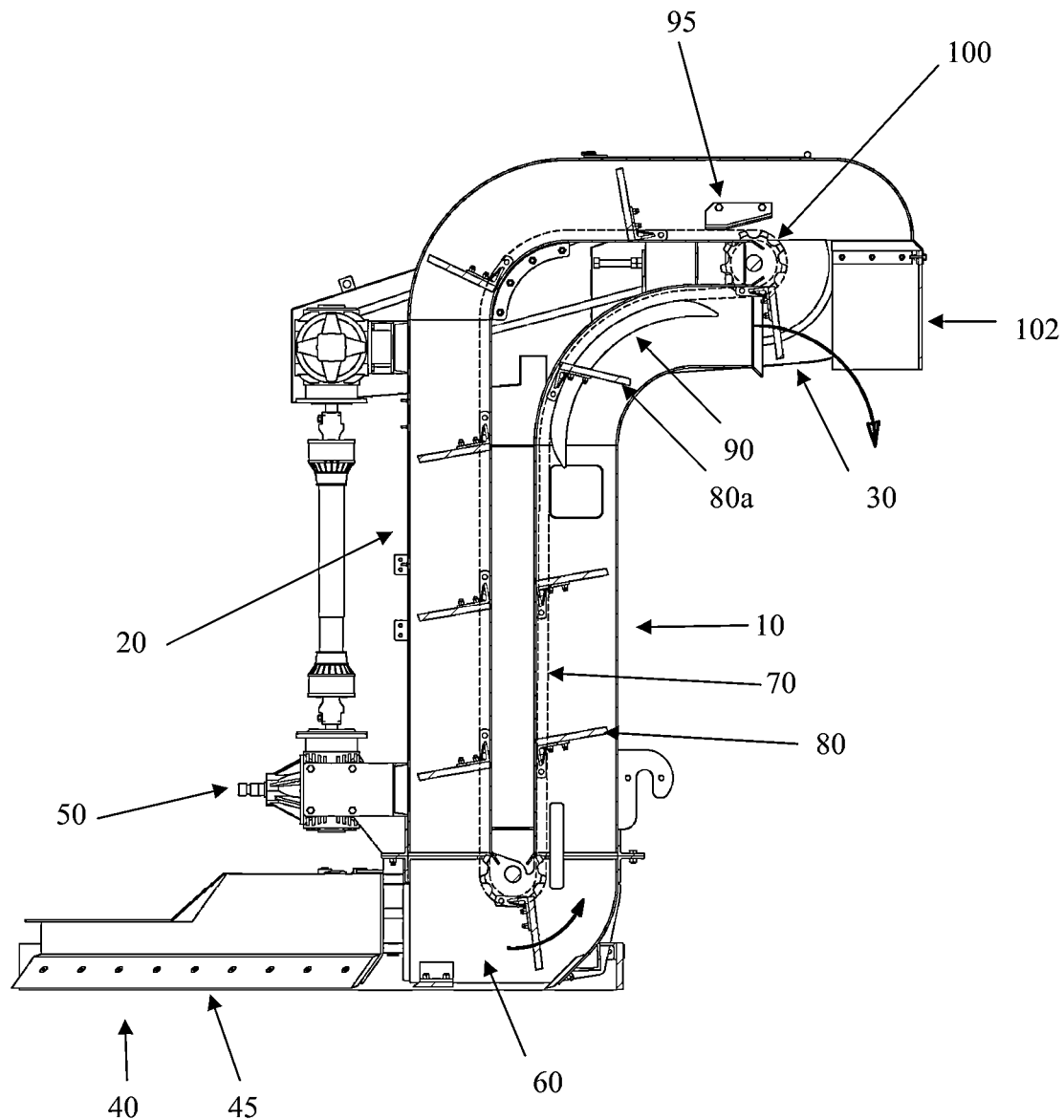
FIG. 1B illustrates a cross sectional elevation view of the apparatus for loading material as illustrated in FIG. 1A.

FIGS. 1A and 1B illustrate an elevation view of an apparatus for loading material in accordance with embodiments of the present technology, wherein FIG. 1B illustrates a cross sectional view of the housing. The apparatus comprises a housing which includes a loading conduit 10 and a return conduit 20, which operatively connect at a first location and a second location. The first location defines a material intake and the second location defines a material output 30. Operative within the housing is a loading mechanism which includes an endless belt or chain 70, to which are anchored a plurality of loading devices 80. The loading mechanism is guided along an endless path which can be considered to begin at the material intake 60, travel within the loading conduit 10 to the material output 30 and subsequently within the return conduit 20 which leads back to the material intake 60. For the guiding of the loading mechanism there are a plurality of guides, for example guides 90 and 95, which provide a means for maintaining a substantially consistent path for the movement of the loading mechanism. The loading mechanism is powered by a drive system 50, which can be coupled to a powering device, for example a tractor or other configuration of towing device, which provides the required power to the drive system 50. For example the drive system can be configured for mating with a power take off (PTO) of a towing vehicle. The drive system includes a power transfer device 100, which provides a means for transferring the power from the drive system to the loading mechanism. As illustrated in FIG. 1B, in some embodiments this power transfer device is configured as a drive sprocket, however the configuration of the power transfer device is dependent on the format of the endless belt or chain. For example in other embodiments, the power transfer device is a powered roller device. The drive system 50 can include one or more gearing systems which can provide a means for converting rotation about a first axis into rotation about another axis. For example the gearing system 51 converts rotation about a vertical axis to rotation about a horizontal axis substantially perpendicular to the travel direction of the apparatus for loading material. In the embodiment illustrated in FIGS. 1A and 1B, the apparatus further includes a material moving system 40, which includes one or more scraping devices 45.

According to some embodiments, as illustrated in FIG. 1B, the loading devices 80 can be configured as plates. The plates are anchored to the endless belt or chain in a manner that during the elevation of the material thereon the plates are angled, namely inclined from horizontal, such that the material is somewhat resistant to falling off the edge of the plate. For example, as illustrated in FIG. 1B, the angle may be 1 to 10 degrees inclined from horizontal, or possibly even a greater angle. In some embodiments, the loading devices can be configured as a scoop shaped device or other configuration which may enhance the collection and retention of the material thereby during collection and elevation within the loading conduit.

According to embodiments of the present technology, the angle associated with the loading devices and the curvature of the loading conduit proximate to the material output can be correlated in order enhance the amount of material that travels the full path from the material intake to the material output. For example, as can be seen in FIG. 1B, and having particular regard to loading device 80a, the relation between the curvature of the loading conduit proximate the material output and the angle of the loading device is configured to substantially mitigate the dropping of material upon reaching this location.

In some embodiments, a shield 102 is operatively connected to the housing at the material output, wherein this shield can be configured to limit the lateral movement of the material upon exit from the housing. The shield can be configured as a flexible flap or a substantially solid flap, such that the desired level of limitation of the lateral movement of the material is provided.

According to embodiments, the housing further comprises one or more access portals or doors which provide access to the interior of the housing, for example access to the loading mechanism which is located within the loading conduit and return conduit of the housing. For example an access door 12 can be positioned at the top of the housing, wherein an example position of an access 12 is more readily viewable in FIG. 4.

Figure 2:
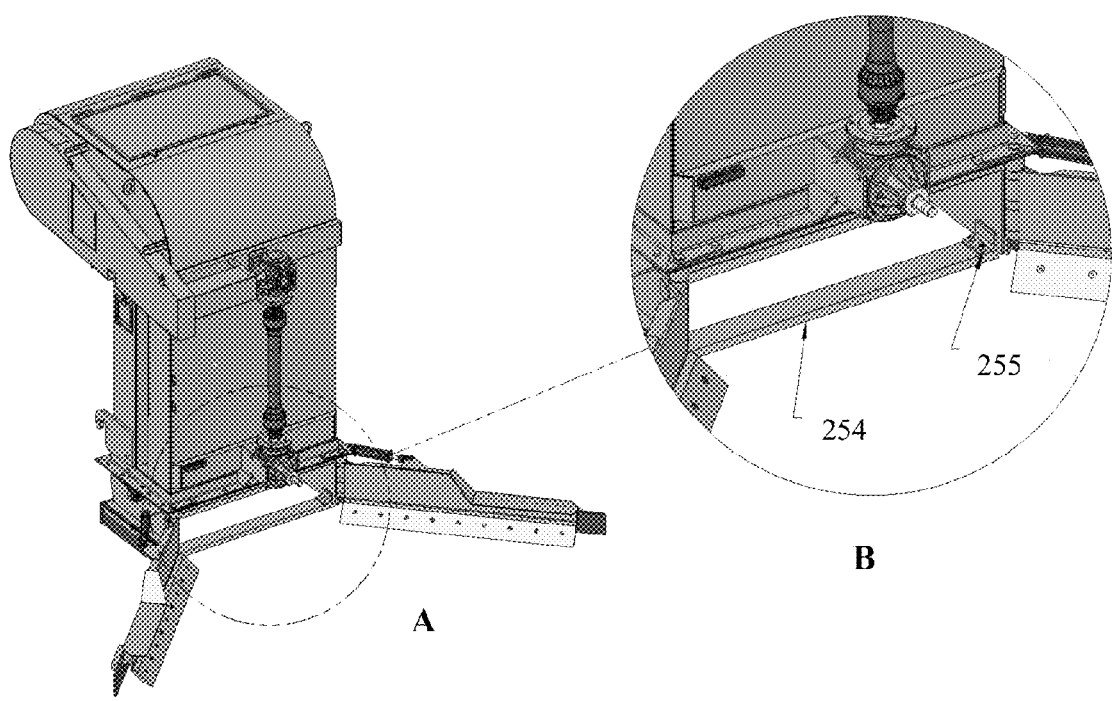
FIG. 2A illustrates a perspective view of an apparatus for loading material in accordance with embodiments of the present technology.
FIG. 2B illustrates a close up view of the portion of the apparatus for loading material as illustrated in FIG. 2A.

FIGS. 2A and 2B is illustrate a perspective view and close up perspective view of an apparatus for loading material in accordance with embodiments of the present technology. In these embodiments, the apparatus further comprises a cutting element 254 which is positioned across the material intake proximate to the location where the loading devices commence the loading of the material. The cutting element can enhance the lifting of material which may be at least partially adhered to the surface from which the material is being loaded. For example the material may be frozen, semi-frozen, dried or semidried or otherwise at least partially adhered to the surface. As illustrated in FIG. 2b, the cutting element 254 can be anchored across the material intake using two or more angle bracket connectors 255, for example. This configuration of connection can provide for the removal of the cutting element when the desired functionality thereof is not desired for the loading of the material.

In some embodiments, proximate to the cutting element 254 an active movement system is operatively positioned. For example, the cutting element, during the cutting process may force some of the material being loaded away from the material intake. Accordingly, an active movement system, for example a brush, rotating brush, tines or the like, or a combination thereof can enhance the movement of material towards the material intake.

According to embodiments, the towing vehicle associated with the apparatus for loading material may be a farm, barn, silo, field, construction or other tractor. The apparatus can be configured to be suitable for agricultural use. The apparatus may be adapted for use in an animal husbandry facility, such as a dairy barn, feed lot or milking shed, which may include alleys or gutters for collection of manure.

According to embodiments of the present technology, the apparatus for loading material can be coupled to a towing vehicle through the use of a quick hitch assembly which can provide a means for ease of connection between the apparatus and the towing vehicle.

Material Moving System

Figure 3:
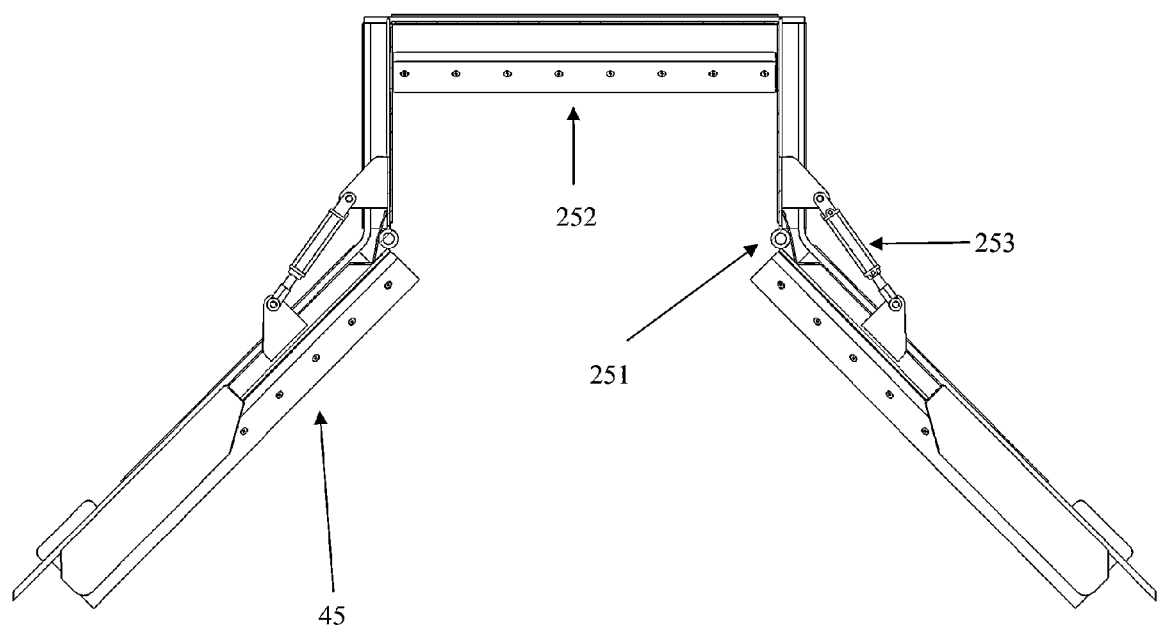
FIG. 3 illustrates a top plan view of a material moving system of an apparatus for loading material according to embodiments of the present technology.

In some embodiments, the apparatus for loading material includes a material moving or scraping system for moving material on the surface towards the material intake. FIG. 3 illustrates a plan view of a material moving system in accordance with embodiments of the present technology.

Depending on the embodiment, the material moving system can be height adjustable such that the distance relative to the surface from which the material is to be collected can be varied. Depending on the embodiment, the material intake may be independently height adjustable of the material moving system, which can be used to adjust material collection in response to the quantity and/or rate of material being collected. This permits the material moving system to remain positioned adjacent or substantially in contact with the floor surface while allowing the material intake to be adjusted relative in height thereto in response to varying quantities of material being collected and/or variations of the surface underneath the apparatus during movement thereof Depending on the embodiment, hydraulically, pneumatically or mechanically controlled mechanisms or other mechanisms may be employed to adjust the height of the material intake and/or the material moving system.

The material moving system is configured for directing the material toward the material intake. In some embodiments, the material moving system includes an active movement system, for example a brush, rotating brush, scraper, squeegee, or a combination thereof for further enhancing the movement of material into the material intake. The material moving system may comprise one or more scraping elements 45, 252, which may be made from a substantially rigid material, for example a metal or alloy, however the one or more scraping elements may have a level of flexibility, for example a durable reinforced rubber or other suitable compound. The material moving system may be height adjustable and may be self-leveling and/or configured to allow manual leveling with respect to the surface from which material is to be collected.

According to some embodiments, the material moving system includes a mechanical, hydraulic, pneumatic and/or otherwise configured suspension system for automatic self-leveling under predetermined operating conditions. The suspension system is configured to allow maintaining predetermined distances between the material moving system and the surface from which material is to be picked up during operation of the apparatus. The suspension system may be configured for adequate operation within a predetermined range of speeds of the apparatus during material collection, material uptake rates and/or other aspects of the apparatus or its operational conditions.

According to embodiments, the material intake may be configured to permit collection across a width of the material moving system or collection of the material may occur at a discrete location or locations. The material moving system may have a shape adapted for funneling and/or ploughing the material toward the material intake. For example, the material moving system may include V-shaped scrapers with the apex of the V formed by the scrapers disposed proximate the material intake. In some embodiments, the apex of the V may have a more planar base at which the material enters the material intake. The material moving system may be disposed proximate the front or end of the apparatus or between the front and end of the apparatus to control compaction of the material on the surface.

According to embodiments, the material moving system can be adjusted to allow control of the width of material collection in the driving direction. For this purpose the material moving system can include a variable width mechanism, for example an actuator 253, enabling rotation about a axis or pin 251 of the wing type elements. The variable width mechanism can be useful in the collection of manure from alleys or gutters, as it allows the material moving system to fit the width of the alley or gutter and can reduce the likelihood of manure escaping from the sides of the material moving system. The material moving system may include wings that are pivotally attached to each side of the material-moving system and able to pivot about vertical pivot axes. The wings may be biased outwardly towards or against the sidewalls of the alley or gutter and may resiliently adapt to changes in the width of the gutter by pivoting about the vertical pivot axis. According to an embodiment, wheels and/or rollers are operatively connected to the tips of the wings and may be employed for resiliently abutting walls, gutters, curbs or other guides provided by the environment, in order to guide the wings, suppress wear/tear, and/or prohibit the wings from getting caught on these environmental formations.

According to an embodiment, the wings are configured to move about one or more vertical or other pivot axes in response to a change in the distance between the side-wall of the alley and the material moving system. The wings may be spring biased or hydraulically or pneumatically adjustable, for example via a pneumatic or hydraulic fluid displacement cylinder, a captive gas shock absorber, or a combination thereof. The material-moving system may be configured to automatically adjust the extension of the wings to cover the width of the alley or gutter or may be manually adjusted by an operator of the apparatus. Depending on the embodiment, the adjustment may be conducted using controls within the towing vehicle. The wings may include skid plates or wear strips to reduce the likelihood of damaging the wings due to operator driving error.

Material Carrying Device

In some embodiments, the apparatus for loading material is operatively coupled to a material carrying device, or trailer, which is configured to receive the material from the material output and provide a means for transporting the collected material away from the collection location, for example within a barn. The material carrying device can include a chassis with one or more wheeled axles associated therewith and a material box or containment device which provides a volume for the loading of material. In some embodiments the apparatus is interconnected with the material carrying device forming a single interconnected system.

Figure 4:
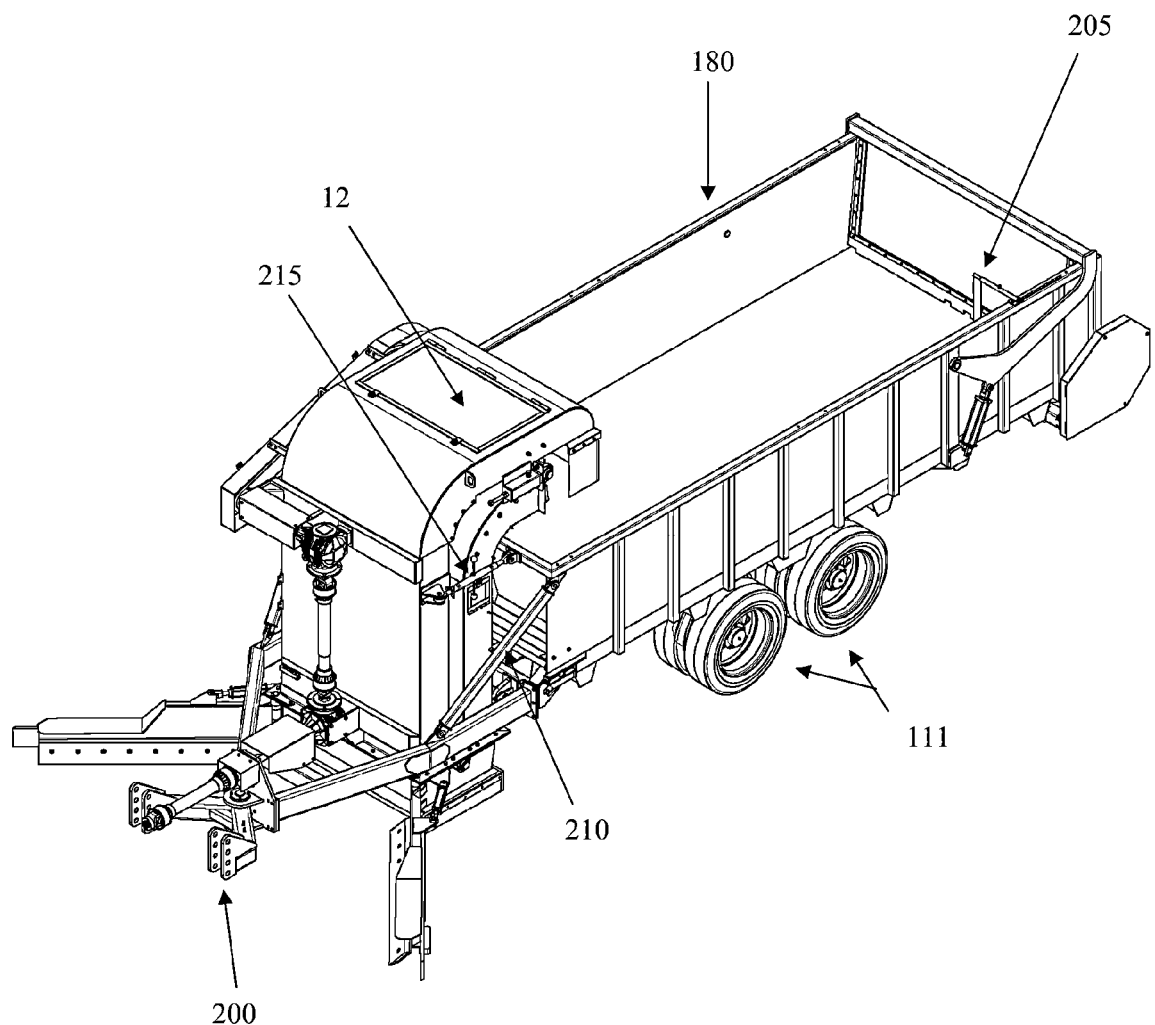
FIG. 4 illustrates a perspective view of an apparatus for loading material operatively integrated with a material carrying device in accordance with embodiments of the present technology.
Figure 5:
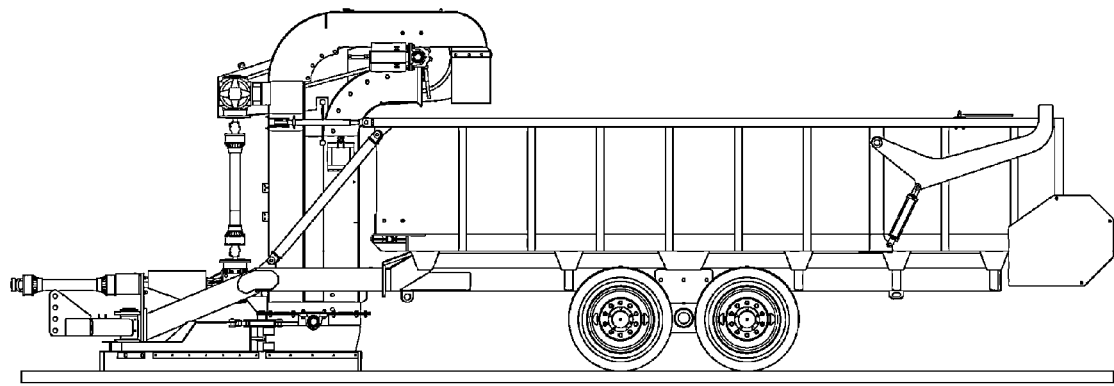
FIG. 5 illustrates an elevation view of the apparatus for loading material operatively integrated with a material carrying device of FIG. 4.

With reference to FIGS. 4 and 5, the apparatus for loading material is interconnected with a material carrying device in accordance with embodiments of the present technology. The apparatus for loading material is interconnected with the material carrying device 180, such that the combination thereof forms an integrated and single component. As illustrated in FIGS. 4 and 4, the interconnection between the apparatus and the material carrying device can be enabled by a plurality of connection struts, for example, 201 and 215. In some embodiments, these connections struts are configured for adjustment of their length, thereby providing a means for modifying the relative orientation and alignment between the apparatus for loading material and the material carrying device.

In some embodiments the apparatus is pin connected to the material carrying device, for example wherein the material carrying device is operable without the apparatus connected thereto. For example the material carrying apparatus can be configured as a manure spreader that is pin connected to the apparatus for movement thereof and collection of the material upon exit from the material output of the apparatus.

The material carrying device includes a suitably configured frame operatively attached to one or more wheel axles and may include a breaking system. The number of wheels, wheel axles, size of the wheels, axle configuration, wheelbases, configuration of the frame as well as other aspects of the material carrying device may be determined based on overall size and/or weight of the apparatus and characteristics of the environment in which the apparatus is intended to be employed, and/or other design aspects.

According to embodiments of the present technology the material carrying device comprises a movable floor, such that as the material is loaded therein by the apparatus for loading material, the floor is moved towards the rear of the material carrying device thereby positioning an empty floor portion substantially below the material output. According to some embodiments, upon movement of the material towards the rear of the material carrying device, the material activates a marker 205, which can be configured to advise the operator of the apparatus that the material carrying device is almost full of material. This can provide the operator with a visual cue in this regard, or optionally a different audible or visual cue for example, light or sound to indicate that the material carrying device is almost full of material can be used.

According to embodiments of the present technology, the material carrying device further comprises a rear gate, which can provide a means for material retention within the material carrying device. In some embodiments, the rear gate can be configured for opening, for example through rotation thereof or lifting thereof, thereby enabling the discharge of the collected material. In some embodiments, the material carrying device can include a rotational beater system, which can be configured to throw the material from the material carrying device at a desired location. This rotational beater system can be similar to that associated with a manure spreader, for example.

FIGS. 4 and 5 illustrate a material carrying device operatively connected to the apparatus for loading material according to embodiments of the present technology. In this embodiment, the material carrying device 180 comprises two pairs of wheeled axles 111 with a corresponding suspension, and a hitch 200 for operative attachment of the apparatus to a towing vehicle (not illustrated). As would be readily understood, the number of axles is dependent on the intended load capacity of the material carrying device and the desired bearing loading of the material carrying device on the surface.

Quick Hitch Assembly

According to embodiments, the apparatus for loading material is operatively connected to a towing vehicle by a quick hitch assembly. This configuration of a hitch assembly can enable the connection of the apparatus to a variety of different towing vehicles, for example tractors, wherein the connection systems associated therewith, while being moveable, may be located at varying heights relative to ground primarily based on the size of the tractor.

Figure 6:
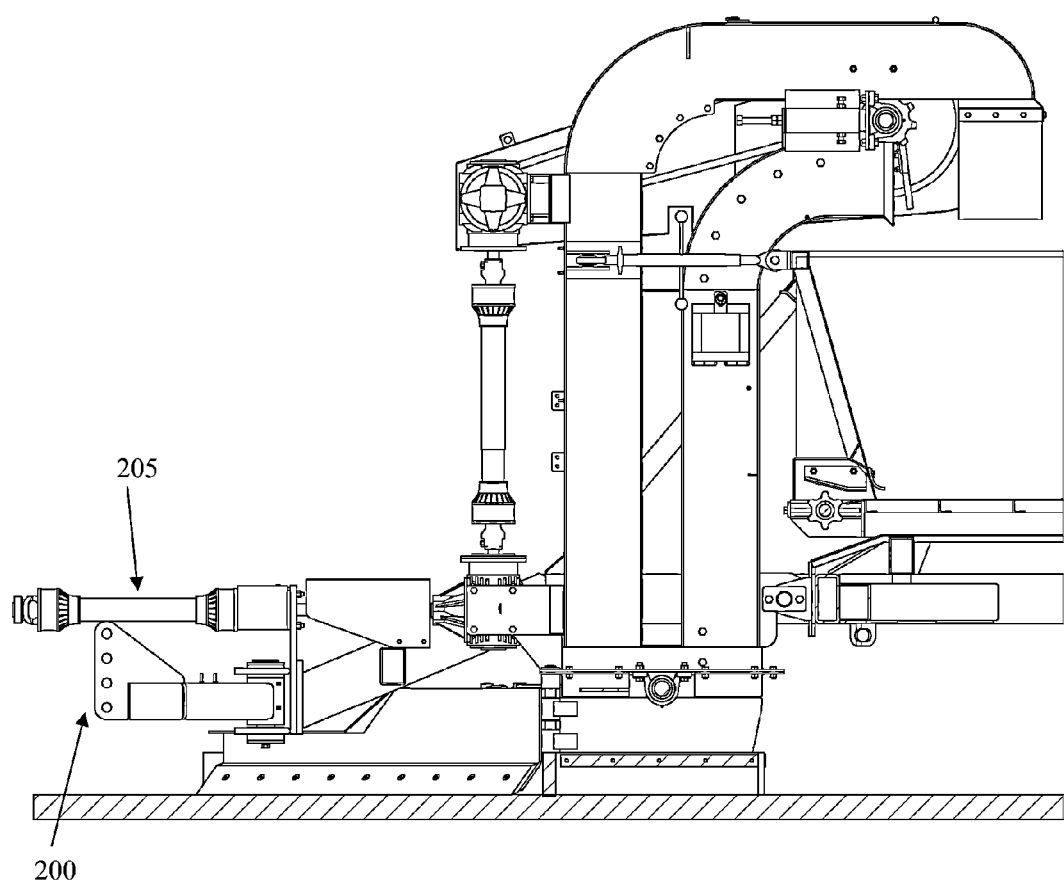
FIG. 6 illustrates a close up elevation view of the apparatus for loading material operatively integrated with a material carrying device of FIG. 4, wherein the material carrying device and the material moving device are illustrated in cross section.

An example of a quick hitch assembly is illustrated in FIG. 6, wherein the quick hitch assembly is operatively connected to the apparatus for loading material. As illustrated, the quick hitch assembly may include a PTO extension for connection to the tractor or towing vehicle. In addition, FIGS. 7A, 7B and 7C illustrate a front, plan and elevation views of a quick hitch assembly connected to a portion of a frame of the apparatus in accordance with embodiments of the present technology.

Figure 7:
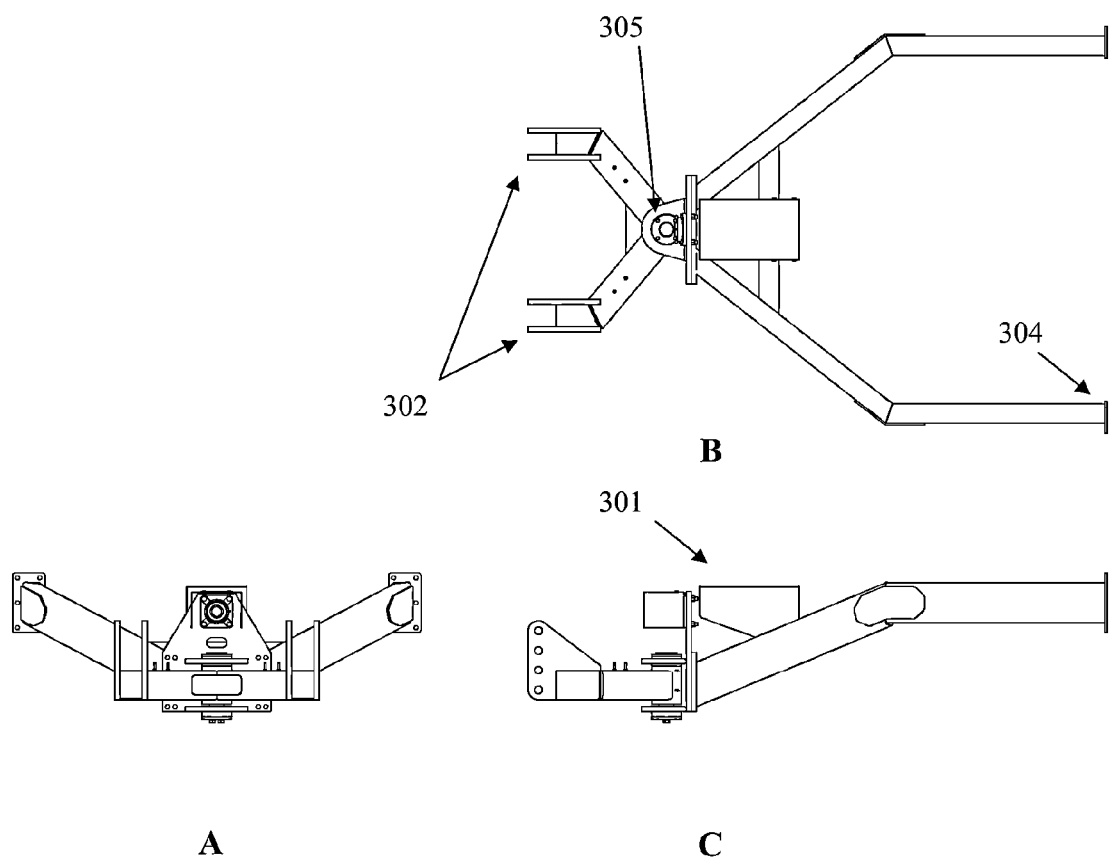
FIGS. 7A, 7B and 7C illustrate top, plan and elevation views, respectively of a quick hitch assembly for operative coupling to an apparatus for loading material in accordance with embodiments of the present technology.

The embodiment of the quick hitch assembly illustrated in FIG. 7, which comprises couplings for connection to the tractor or towing vehicle, the apparatus for loading material as well as power transfer system 301. As illustrated in FIG. 7, this embodiment of the quick hitch assembly comprises two tractor or towing vehicle anchorage locations 302, which are configured for connection to the lift arms of a tractor. The quick hitch assembly further comprises two apparatus anchorage locations 304, which are configured for direct connection to the material carrying device. In addition, the quick hitch assembly also comprises a rotational hinge 305, which is configured for rotation about a substantially vertical axis, for example enabling yaw movement.

It is obvious that the foregoing embodiments of the technology are examples and can be varied in many ways. Such present or future variations are not to be regarded as a departure from the spirit and scope of the invention, and all such modifications as would be obvious to one skilled in the art are intended to be included within the scope of the following claims.

I claim:

1. An apparatus for loading material, the apparatus configured to be operatively connected to a towing vehicle, the apparatus comprising:
    a loading conduit and a return conduit spaced from and separated from the loading conduit, the loading conduit and return conduit each having respective and separated housing portions, and wherein the loading conduit and return conduit are operatively configured for material intake at a first location and configured for material output at a second location;
    a loading mechanism operative within the loading conduit and the return conduit, the loading mechanism including a single endless belt having a plurality of loading plates anchored thereto, the single endless belt configured to travel within the loading conduit from the first location to the second location and subsequently within the return conduit from the second location to the first location, the loading mechanism picking up material at the first location and expelling material at the second location, wherein travel of the single endless belt within the loading conduit includes travel in a vertical direction in a first portion of the loading conduit and travel in a horizontal direction in a second portion of the loading conduit, and wherein the loading plates are anchored to the endless belt such that when the loading plates are elevating the material in the loading conduit, the loading plates are inclined upwardly from horizontal and an angle formed between the vertically travelling single endless belt and the loading plates is between 1 and 10 degrees from horizontal; and
    a drive system operatively connected with the loading mechanism, the drive system configured to provide power to the loading mechanism;
    wherein the loading conduit surrounds the endless belt from the first location to the second location and the return conduit surrounds the endless belt from the second location to the first location; and wherein when the single endless belt is travelling in the horizontal direction the second portion of the loading conduit is located below and separated from the return conduit.

2. The apparatus for loading material according to claim 1, wherein said apparatus is configured such that the drive system receives power from the towing vehicle.

3. The apparatus for loading material according to claim 1, further comprising a material moving system comprising wings configured for pivotal movement about a vertical pivot axes.

4. The apparatus for loading material according to claim 1, wherein the housing comprises one or more access portals, at least one of the access portals providing access to the loading mechanism.

5. The apparatus for loading material according to claim 1, wherein travel of the loading mechanism within the loading conduit includes travel in at least two different directions corresponding to a curvature of the loading conduit.

6. The apparatus for loading material according to claim 1, the apparatus further configured for use in an animal husbandry facility.

7. The apparatus for loading material according to claim 1, further comprising a quick hitch assembly configured for connection to a variety of different towing vehicles.

8. The apparatus for loading material according to claim 7, wherein the quick hitch assembly is configured to rotate about a vertical axis thereby enabling yaw movement.

9. The apparatus for loading material according to claim 1, further comprising a material moving system configured for operative disposition adjacent a surface upon which the material is located, the material-moving system configured to move the material on the surface towards the material intake when the apparatus moves in a forward direction.

10. The apparatus for loading material according to claim 9, wherein the material-moving system comprises one or more scrapers, brushes or ploughs.

11. The apparatus for loading material according to claim 9, wherein the material-moving system is stationary relative to the apparatus during operation, and wherein the material-moving system is configured to channel the material on the surface towards the material intake due to forward motion of the material-moving system relative to the material when the apparatus and the material-moving system move in the forward direction.

12. The apparatus for loading material according to claim 1, further comprising a cutting element positioned at the material intake.

13. The apparatus for loading material according to claim 12, wherein the cutting element is anchored across the material intake in a fixed position, the cutting element configured to cut through material presented to the material intake due to a forward motion of the apparatus and the cutting element.

14. The apparatus for loading material according to claim 12, further comprising an active movement system proximate to the cutting element.

15. The apparatus for loading material according to claim 14, wherein the cutting element is anchored across the material intake in a fixed position, and wherein the active movement system is separate from the cutting element.

16. The apparatus for loading material according to claim 1, wherein the apparatus is operatively connected to a material carrying device configured to receive the material expelled from the material output.

17. The apparatus for loading material according to claim 16, wherein the apparatus for loading material and the material carrying device are operatively connected by a plurality of connection struts, said connection struts configured for adjustment of their length, thereby enabling modification of relative orientation and alignment between the apparatus for loading material and the material carrying device.

18. The apparatus for loading material according to claim 16, wherein the apparatus for loading material and the material carrying device form a single interconnected system.

19. The apparatus for loading material according to claim 18, wherein the material carrying device is configured to retain the material within the material carrying device during loading of the material.

20. The apparatus for loading material according to claim 19, wherein the apparatus for loading material and the material carrying device are operatively connected by a plurality of connection struts, said connection struts configured for adjustment of their length, thereby enabling modification of relative orientation and alignment between the apparatus for loading material and the material carrying device.

* * * * *